(12) United States Patent
Li (10) Patent No.: US 9,591,546 B2
(45) Date of Patent: Mar. 7, 2017

(54) METHOD FOR HANDING OVER CLUSTER UE, APPARATUS FOR HANDING OVER CLUSTER UE, CLUSTER UE, COMPRISING APPARATUS FOR HANDING OVER CLUSTER UE, AND NETWORK SIDE DEVICE COMPRISING APPARATUS FOR HANDING OVER CLUSTER UE

(71) Applicant: ZTE CORPORATION, Shenzhen, Guangdong Province (CN)

(72) Inventor: Bo Li, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/370,072

(22) PCT Filed: Jul. 4, 2013

(86) PCT No.: PCT/CN2013/078801
§ 371 (c)(1),
(2) Date: Jul. 1, 2014

(87) PCT Pub. No.: WO2013/178131
PCT Pub. Date: Dec. 5, 2013

(65) Prior Publication Data
US 2015/0163717 A1 Jun. 11, 2015

(30) Foreign Application Priority Data
Aug. 15, 2012 (CN) .......................... 2012 1 0290206

(51) Int. Cl.
*H04W 36/30* (2009.01)
*H04W 36/00* (2009.01)
*H04W 88/02* (2009.01)

(52) U.S. Cl.
CPC ....... *H04W 36/30* (2013.01); *H04W 36/0072* (2013.01); *H04W 88/02* (2013.01)

(58) Field of Classification Search
CPC .. H04W 88/02; H04W 36/30; H04W 36/0072
(Continued)

(56) References Cited

U.S. PATENT DOCUMENTS

2002/0119792 A1 8/2002 Silvestri
2003/0076812 A1* 4/2003 Benedittis ........... H04W 74/002
370/350

(Continued)

FOREIGN PATENT DOCUMENTS

CN 101087447 A 12/2007
CN 101562859 A 10/2009
(Continued)

OTHER PUBLICATIONS

International Search Report for PCT/CN2013/078801 dated Sep. 18, 2013.

*Primary Examiner* — Kamran Afshar
*Assistant Examiner* — Nicole Louis-Fils
(74) *Attorney, Agent, or Firm* — Ling Wu; Stephen Yang; Ling and Yang Intellectual Property (57) ABSTRACT

A method for handing over a cluster UE includes: measuring signal quality of a current cell and signal quality of a neighboring cell; determining whether both the signal quality of current cell and the signal quality of neighboring cell meet a preset decision rule, and obtaining a determination result; and when the determination result is that both the signal quality of current cell and the signal quality of neighboring cell meet the preset decision rule, controlling the current cell to hand over to the neighboring cell, to make a cluster UE continue, in the neighboring cell, a service performed in the current cell. By adopting the technical (Continued)

scheme of the present invention, the mobility management of a cluster UE in a cluster system based on a TD standard can be implemented, and when moving in a cell, the cluster UE can be handed over without interrupting a current service.

11 Claims, 4 Drawing Sheets

(58) Field of Classification Search
USPC .......... 370/280, 281, 279; 455/437, 518
See application file for complete search history.

(56) References Cited

U.S. PATENT DOCUMENTS

| | | | |
|---|---|---|---|
| 2006/0034205 A1* | 2/2006 | Kim | H04W 76/002 370/312 |
| 2008/0220766 A1* | 9/2008 | Bertho | H04W 36/30 455/423 |
| 2009/0122730 A1* | 5/2009 | Yang | H04W 36/30 370/280 |
| 2012/0113862 A1* | 5/2012 | Santhanam | H04W 84/045 370/254 |
| 2012/0207070 A1* | 8/2012 | Xu | H04W 48/20 370/311 |

FOREIGN PATENT DOCUMENTS

| | | |
|---|---|---|
| CN | 102111839 A | 6/2011 |
| WO | WO 01/86975 A2 * | 11/2001 |

* cited by examiner

MAIL FOR HANDING OVER CLUSTER
UE, APPARATUS FOR HANDING OVER
CLUSTER UE, CLUSTER UE, COMPRISING
APPARATUS FOR HANDING OVER
CLUSTER UE, AND NETWORK SIDE
DEVICE COMPRISING APPARATUS FOR
HANDING OVER CLUSTER UE

TECHNICAL FIELD

The present invention relates to the communication technology field, and in particular, to a method and apparatus for handing over a cluster UE, a cluster UE and a network side device.

BACKGROUND OF THE RELATED ART

The cluster communication service is a half-duplex two-way service, and realizes the one-to-more service. The characteristic of the cluster user is that one user is speaking and one or more users are listening. After the users who need to speak initiate a request for speaking right, the network determines who can get the speaking right according to a certain seizing policy; the user who gets the speaking right becomes the speaking user, and other users in the cluster group become the listening users. Thus, it can vary repeatedly to let the users in the group speak and communicate, until the cluster call is over.

On the basis of the above-mentioned characteristic of the cluster, during the process of one cluster group call, the uplink service physical channel resources are time-division multiplexed by the users in the group. During a time period when a certain user speaks, these uplink physical resources are enjoyed alone by the speaking user. The downlink service physical channel resources are shared by all listening users in the group during the conversation of cluster group. In a cell, the physical resources between different groups are enjoyed alone.

The cluster system is often used in the domains, such as, meeting an emergency, job scheduling, traffic guidance, etc. In the usage procedure of the cluster UE (User Equipment) application, the cluster UE often moves from a cell to another cell. In the cluster system, the physical channel resources are divided by groups, and different physical channel resources are allocated to different groups. For the physical channel resources allocated to the same group, all UEs in this group share the physical channel. The uplink physical channel resources are enjoyed alone by the speaking user, and the downlink physical channel resources are shared by listening users in the group. The network side is unable to distinguish every UE, so it sends the handover message to every UE respectively.

Thus, there is a problem that the cluster UE cannot hand over the cell freely in the movement process in the relevant cluster system.

CONTENT OF THE INVENTION

The present invention provides a method and apparatus for handing over a cluster UE, a cluster UE and a network side device, used for solving the problem that the cluster UE cannot hand over the cell freely in the movement process in the current cluster system.

In order to realize the above-mentioned objective, a method for handing over a cluster UE is provided according to a first aspect of the present invention, and the following technical scheme is adopted:

measuring signal quality of a current cell and signal quality of a neighboring cell;

determining whether both the signal quality of the current cell and the signal quality of the neighboring cell meet a preset decision rule, and obtaining a determination result; and when the determination result is that both the signal quality of the current cell and the signal quality of the neighboring cell meet the preset decision rule, controlling the current cell to hand over to the neighboring cell, to make a cluster UE continue, in the neighboring cell, a service performed in the current cell.

The cluster UE is a speaking user; and the step of measuring the signal quality of the current cell and the signal quality of the neighboring cell comprises:

receiving a measurement instruction of a network side, measuring the signal quality of the neighboring cell and the signal quality of the current cell according to neighboring cell information and current cell information in the measurement instruction.

The step of controlling the current cell to hand over to the neighboring cell comprises:

triggering and sending a measurement report of the neighboring cell to the network side;

receiving a handover instruction sent by the network side according to the measurement report of the neighboring cell; and configuring the current cell as the neighboring cell according to neighboring cell resource information in the handover instruction.

The cluster UE is a listening user; and the step of measuring the signal quality of the current cell and the signal quality of the neighboring cell comprises:

obtaining the neighboring cell information from scheduling information of a system information block; and measuring the signal quality of the current cell and the signal quality of the neighboring cell according to the neighboring cell information and the current cell information.

The step of controlling the current cell to hand over to the neighboring cell comprises:

obtaining the neighboring cell resource information received from a specific forward access channel (FACH) of the cluster from a local storage module; and configuring the current cell as the neighboring cell according to the neighboring cell resource information.

An apparatus for handing over a cluster UE is provided according to a second aspect of the present invention, comprising:

a measurement module, configured to measure signal quality of a current cell and signal quality of a neighboring cell;

a determination module, configured to determine whether both the signal quality of the current cell and the signal quality of the neighboring cell meet a preset decision rule, and obtain a determination result; and a handover module, configured to: when the determination result is that both the signal quality of the current cell and the signal quality of the neighboring cell meet the preset decision rule, control the current cell to hand over to the neighboring cell, to make a cluster UE continue, in the neighboring cell, a service performed in the current cell.

The cluster UE is a speaking user; and the measurement module comprises:

a first receiving module, configured to receive a measurement instruction of a network side, and measure the signal quality of the neighboring cell and the signal quality of the current cell according to neighboring cell information and current cell information in the measurement instruction.

The handover module comprises:

a triggering module, configured to trigger and send a measurement report of the neighboring cell to the network side;

a second receiving module, configured to receive a handover instruction sent by the network side according to the measurement report of the neighboring cell; and a first configuration module, configured to configure the current cell as the neighboring cell according to neighboring cell resource information in the handover instruction.

The cluster UE is a listening user; and the measurement module comprises:

a first obtaining module, configured to obtain the neighboring cell information from scheduling information of a system information block; and a measurement sub-module, configured to measure the signal quality of the current cell and the signal quality of the neighboring cell according to the neighboring cell information and the current cell information.

The handover module comprises:

a second obtaining module, configured to obtain the neighboring cell resource information received from a specific forward access channel (FACH) of the cluster from a local storage module; and a second configuration module, configured to configure the current cell as the neighboring cell according to the neighboring cell resource information.

A cluster UE is provided according to a third aspect of the present invention, comprising the above-mentioned apparatus for handing over a cluster UE.

Another method for handing over a cluster UE is provided according to a fourth aspect of the present invention, comprising:

sending a measurement instruction to the cluster UE, to control the cluster UE to measure signal quality of a current cell and signal quality of a neighboring cell;

receiving a measurement report of the neighboring cell sent by the cluster UE, wherein, the measurement report of the neighboring cell is triggered and sent to the network side by the cluster UE according to a preset decision rule when determining that both the signal quality of the current cell and the signal quality of the neighboring cell meet the preset decision rule; and sending a handover instruction to the cluster UE according to the measurement report of the neighboring cell, to control the cluster UE to hand over from the current cell to the neighboring cell, to make the cluster UE continue, in the neighboring cell, a service performed in the current cell.

An apparatus for handing over a cluster UE is provided according to a fifth aspect of the present invention, comprising:

a first transmitting module, configured to send a measurement instruction to the cluster UE, to control the cluster UE to measure signal quality of a current cell and signal quality of a neighboring cell;

a receiving module, configured to receive a measurement report of the neighboring cell sent by the cluster UE, wherein, the measurement report of the neighboring cell is triggered and sent to the network side by the cluster UE according to a preset decision rule when determining that both the signal quality of the current cell and the signal quality of the neighboring cell meet the preset decision rule; and a second transmitting module, configured to send a handover instruction to the cluster UE according to the measurement report of the neighboring cell, to control the cluster UE to hand over from the current cell to the neighboring cell, to make the cluster UE continue, in the neighboring cell, a service performed in the current cell.

A network side device is provided according to a sixth aspect of the present invention, comprising the above-mentioned apparatus for handing over a cluster UE.

It can be known from the above-mentioned technical scheme of the present invention, since the uplink channel resources are shared by the speaking user, the cluster UE in the speaking state can report the measurement report of the neighboring cell, and the network can determine to configure the UE to the target cell according to the measurement report reported by the cluster UE in the speaking state and the current state of the network, to successfully realize the handover process of the UE in the speaking state. As to the listening user, it can obtain the resource information of the neighboring cell from the local storage module, and the following handover can be handed over to the target cell according to the stored resource information of the neighboring cell.

BRIEF DESCRIPTION OF DRAWINGS

The accompanying drawings described herein are used to provide further understanding for the present invention and constitute a part of the present application. The illustrated embodiments of the present invention and the description thereof are used to explain the present invention, rather than constituting an inappropriate limitation to the present invention. Wherein.

PREFERRED EMBODIMENTS OF THE PRESENT INVENTION

The embodiments of the present invention are described in detail with reference to the accompanying drawings hereinafter, however, the present invention can be implemented by various embodiments limited and covered by the appended claims.

Before introducing the specific technical scheme of the present invention, it needs to understand how to obtain the neighboring cell resource information by the user in a listening state in the cluster UE, and the following two embodiments provide how to obtain the neighboring cell resource information by the user entering into the listening state from the idle state and entering into the listening state from the speaking state.

Figure 1:
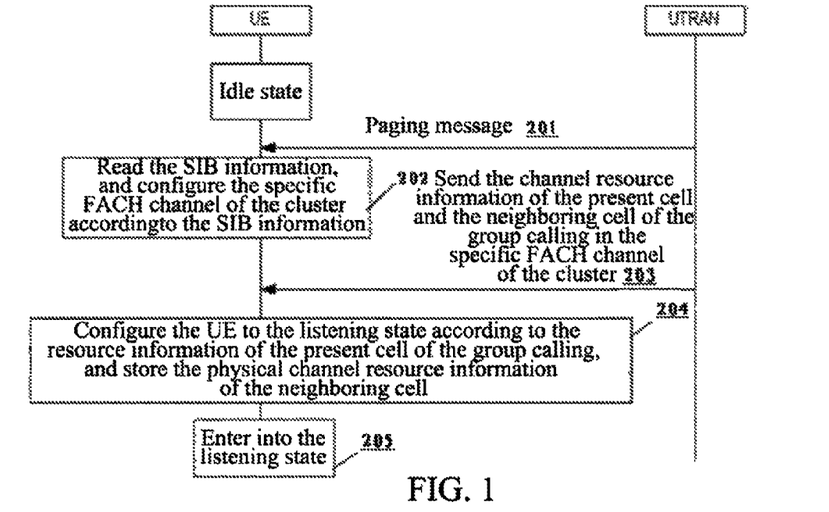
FIG. 1 is a flow chart of a cluster UE in an idle state receiving a group calling paging and entering into a listening state according to the present invention.

FIG. 1 shows a flow chart of a cluster UE in an idle state receiving a group calling paging and entering into a listening state according to the present invention.

Referring to FIG. 1, the cluster UE in the idle state receiving the group calling paging and entering into the listening state specifically includes the following steps:

in step 201: a cluster UE in the idle state receives a paging message of a cluster group calling.

In step 202: the UE will read the current system information block (SIB), and the SIB of the cluster system includes the resource information required by a specific forward access channel (FACH) of the cluster, and the UE configures the specific FACH channel of the cluster according to the resource information.

In step 203: after establishing a group calling, the network side will send the resource information of the present cell and the neighboring cell of the current group calling for configuring the UE to the listening state in the specific FACH channel of the cluster.

In step 204: the UE configures the UE to the listening state according to the resource information of the present cell, and stores the neighboring cell resource information of the group calling to a local memory module meanwhile.

In step 205: the cluster UE enters into the listening state.

In the above-mentioned process, after establishing a group calling, the network side will send the resource information of the present cell and the neighboring cell of the current group calling for configuring the UE to the listening state in the specific FACH channel of the cluster. The UE configures the UE to the listening state according to the resource information of the present cell, and stores the neighboring cell resource information of the group calling locally meanwhile, and therefore, then when the cluster UE needs to perform the cell handover, it can obtain the neighboring cell resource information locally in order to realize the cell handover.

Figure 2:
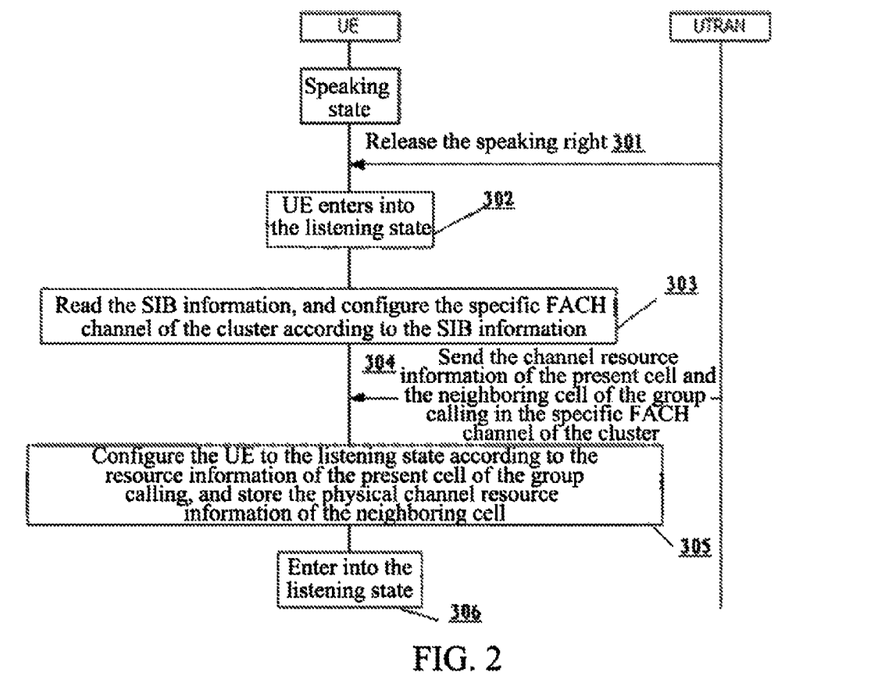
FIG. 2 is a flow chart of a cluster UE in a speaking state handing over to a listening state according to the present invention.

FIG. 2 is a flow chart of a cluster UE in a speaking state handing over to a listening state according to the present invention.

Referring to FIG. 2, the step of the cluster UE in the speaking state handing over to the listening state is as follows:

in step 301: the network side releases the speaking right.

In step 302: after the network side releases the speaking right, the UE configures the listening state.

In step 303: the UE needs to read the SIB, and configures the FACH channel according to the configuration resources of the specific FACH channel of the cluster in the SIB.

In step 304: the network side sends the channel resource information of the present cell and the neighboring cell of the group calling according to the specific FACH channel of the cluster.

In step 305: the UE is configured to enter into the listening state according to the resource information of the present cell of the group calling, and the resource information of the physical channel of the neighboring cell is stored.

In step 306: the cluster UE enters into the listening state.

In sum, it can be known that the mode of obtaining the neighboring cell resource information includes the followings:

1, when the UE hands over to the listening state from the idle state, the UE reads the channel resource information of the present cell and neighboring cell of the current group calling in the specific FACH channel of the cluster according to the configured specific FACH channel in the SIB, and then the resource information of the current group calling is configured, and the UE enters into the listening state, and the channel resource information of the neighboring cell is stored for the following resource configuration when the new cell is handed over.

2, when the UE hands over to the listening state from the speaking state, the UE enters into the speaking state for the first time or the UE hands over to the speaking state from the listening state and the cell handover is performed in the speaking state process, and the UE does not obtain the physical channel resources of the neighboring cell from the specific FACH channel, therefore, it also needs to configure the specific FACH channel of the cluster when handing over to the listening state from the speaking state, and the channel resource information of the neighboring cell is read, for the following resource configuration when the new cell is handed over.

3, after the listening user is handed over to the new cell successfully, since the cell changes, the neighboring cell relationship of the new cell is different from that of original cell, and it also needs to re-obtain the physical channel resource information of the neighboring cell. The UE of the listening user re-obtains the SIB information of the new cell, reads the specific FACH channel of the cluster according to the SIB information, configures the specific FACH channel, and obtains the physical channel resource information of the neighboring cell of the new cell, for the following resource configuration when the new cell is handed over.

Figure 3:
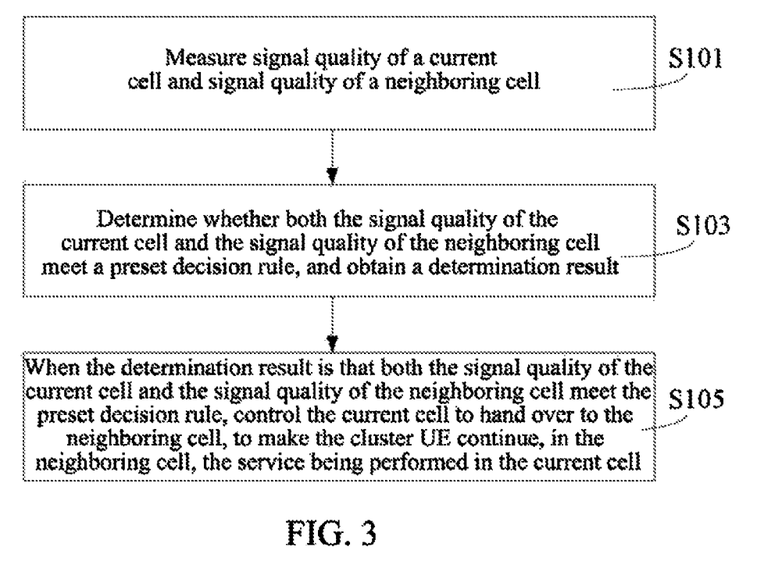
FIG. 3 is a flow chart of a method for handing over a cluster UE described in an embodiment of the present invention.

FIG. 3 shows a flow chart of a method for handing over a cluster UE described in an embodiment of the present invention.

As shown in FIG. 3, the method for handing over a cluster UE can include the following steps:

in S101: signal quality of a current cell and signal quality of a neighboring cell are measured.

In S103, whether both the signal quality of the current cell and the signal quality of the neighboring cell meet a preset decision rule is determined, and a determination result is obtained.

In S105, when the determination result is that both the signal quality of the current cell and the signal quality of the neighboring cell meet the preset decision rule, the cluster user equipment (UE) is handed over to the neighboring cell from a current cell.

The above-mentioned technical scheme of above example is a technical scheme that the current located cell is handed over to the neighboring cell after the cluster UE finds a better neighboring cell when moving in the cell. The so-called better neighboring cell refers to a cell with the higher signal quality, however, whether to perform the handover still needs to follow a decision rule. The decision rule is preset and stored in the protocol frame, for example, if the signal quality of the neighboring cell is a threshold greater than the signal quality of the present cell, then it triggers and sends a measurement report to the network, and determines that the network control is handed over to the neighboring cell.

Figure 4:
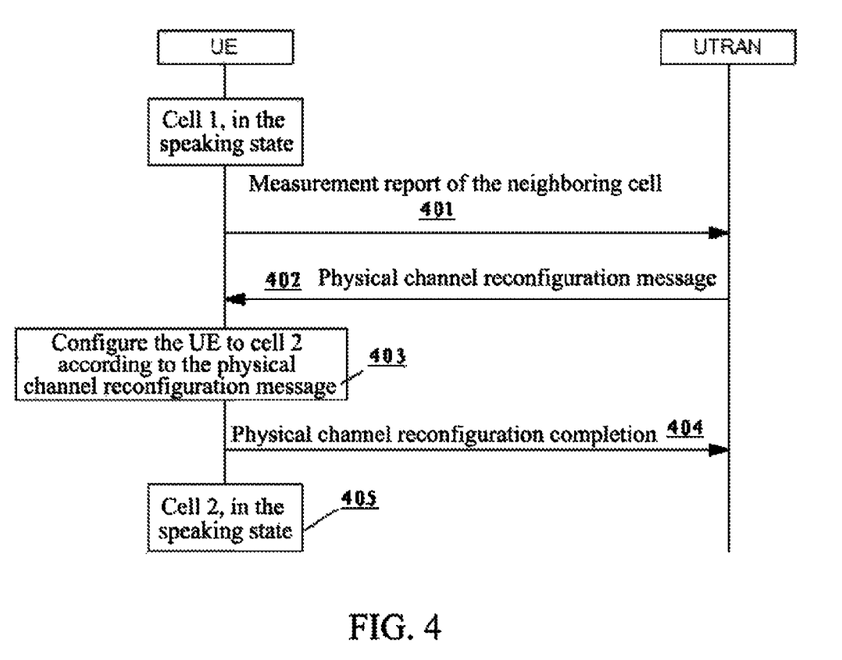
FIG. 4 is a flow chart of handing over a cluster UE in a speaking state described in an embodiment of the present invention.

FIG. 4 shows a flow chart of handing over a cluster UE in a speaking state described in an embodiment of the present invention.

As shown in FIG. 4, in the present embodiment, the current cell is set as cell 1 and the neighboring cell to which it is required to be handed over is set as cell 2. The UE is in the cell 1 and in the speaking state at present, and therefore, the specific steps for realizing handing over the cluster UE in the speaking state can include the following steps:

in step 401: the UE is a speaking user, and the speaking user measures the signal quality of cell 1 and cell 2 according to the measurement instruction of the network side. After the UE finds a better neighboring cell, that is, it finds that the signal quality of the cell 2 is better than the signal quality of the cell 1, and the UE will trigger the measurement report of the neighboring cell.

In step 402: after receiving the measurement report, the network side will send the resource information of the cell 2 to the UE through a physical channel reconfiguration message.

In step 403: the UE will configure the resources of the cell 2 according to the resource message of the cell 2 sent by the network after receiving it.

In step 404: after the configuration is successful, a physical channel reconfiguration completion message is sent to the network side.

In step 405: the UE enters into the speaking state in the cell 2.

The above-mentioned technical scheme aims at the cell handover of the UE in the speaking state in the cluster UE, and the process can enable the speaking user in the cluster UE to be handed over instead of interrupting the present service when moving in the cell, to realize the mobility management of the cluster UE.

Figure 5:
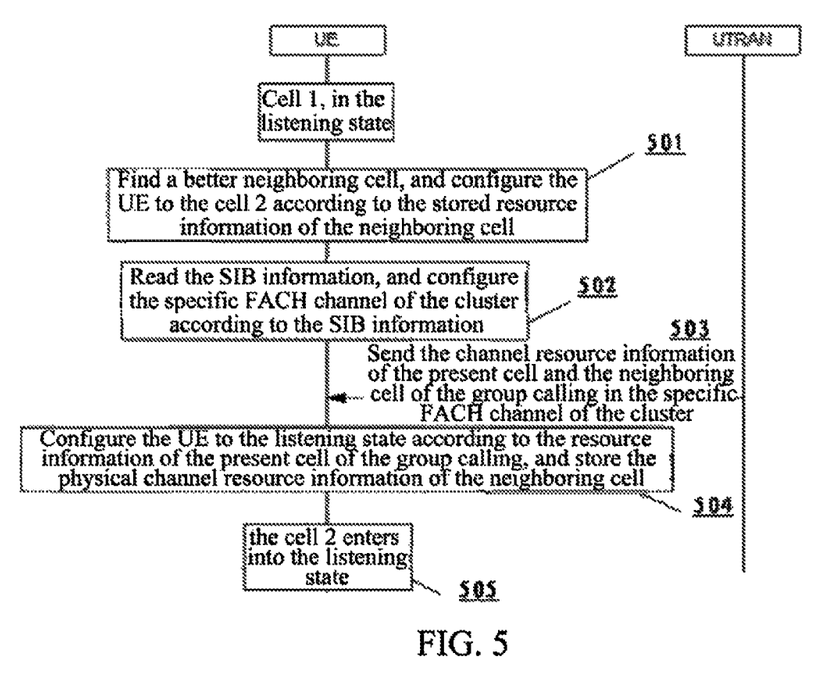
FIG. 5 is a flow chart of handing over a cluster UE in a listening state described in an embodiment of the present invention.

FIG. 5 is a flow chart of handing over a cluster UE in a listening state described in an embodiment of the present invention.

As shown in FIG. 5, similar in the present embodiment, the current cell is set as cell 1 and the neighboring cell to which it is required to be handed over is set as cell 2. And the uplink channel in the cluster service is enjoyed alone by the speaking user; the uplink channel cannot be used when the cluster UE of the listening user performs the service. The listening user cannot be the same as the speaking user. When finding a better neighboring cell, the speaking user notifies the measurement information of the neighboring cell in the network through the measurement report, and the network side determines that the UE is handed over to the appropriate cell according to the measurement information of the neighboring cell. When finding the better neighboring cell, the listening user UE configures the resources of the bottom layer according to the neighboring cell resource information received in the specific FACH of the cluster, and the neighboring cell resource information has already been shown clearly and stored locally in the embodiment of FIG. 1 and FIG. 2, that is, obtaining the neighboring cell resource information from the specific FACH of the cluster and storing it in a local memory module when the listening user is in the idle state and the speaking user is handed over to the listening user.

More specifically, the step for handing over the cluster UE in the listening state can include the following steps:

in step 501: the UE is in the cell 1 and in the listening state at present, that is, when the cluster UE in the listening state in the cell 1 finds a better cell 2 through reading the neighboring cell information in the system information, the UE will configure the UE to be in the listening state in the cell 2 according to the physical channel resource information of the cell 2 stored before.

In step 502: in the cell 2, the UE needs to read the SIB information, and configure the FACH channel according to the configuration resources of the specific FACH channel of the cluster in the SIB.

In step 503: the specific FACH channel of the cluster sends the channel resource information of the cell 1 and cell 2 of group calling.

In step 504: the UE is configured to be in the listening state according to the resource information of the present cell of the group calling, and the physical channel resource information of the neighboring cell is stored.

In step 505: the UE enters into the listening state in the cell 2.

As described above, it can be known that the handover procedure for the listening user is as follows: 1, obtaining the resource information of a TFACH channel (a newly defined channel, different from the FACH channel in the TD) from the SIB; 2, configuring the TFACH channel; 3, obtain the resource configuration (PHY, MAC, RLC, etc.) of the current listening user and the resource configuration information of the neighboring cell from the TFACH channel; 4, measuring and finding that a better cell meets the handover threshold, directly tracking the resource configuration information of the neighboring cell received in the TFACH channel before, and configuring the target cell to which it is handed over directly (the neighboring cell, already obtaining the resource configuration information of the neighboring cell before the handover in other words).

Figure 6:
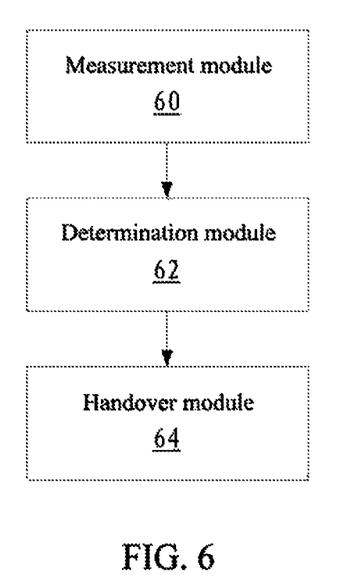
FIG. 6 is a structure diagram of an apparatus for handing over a cluster UE described in an embodiment of the present invention.

FIG. 6 is a structure diagram of an apparatus for handing over a cluster UE described in an embodiment of the present invention.

As shown in FIG. 6, the apparatus for handing over a cluster UE includes: a measurement module 60, configured to measure signal quality of a current cell and signal quality of a neighboring cell; a determination module 62, configured to determine whether both the signal quality of the current cell and the signal quality of the neighboring cell meet a preset decision rule, and obtain a determination result; and a handover module 64, configured to: when the determination result is that both the signal quality of the current cell and the signal quality of the neighboring cell meet the preset decision rule, enable a cluster UE to hand over from the current cell to the neighboring cell.

Preferably, the cluster UE includes a speaking user and a listening user; when the cluster UE is the speaking user, the measurement module 60 includes: a first receiving module (not shown in the figure), and the first receiving module is configured to receive a measurement instruction of a network side, and measure the signal quality of the neighboring cell and the signal quality of the current cell according to neighboring cell information and current cell information in the measurement instruction.

Preferably, the handover module 64 includes: a triggering module (not shown in the figure), configured to trigger and send a measurement report of the neighboring cell to the network side; a second receiving module (not shown in the figure), configured to receive a handover instruction sent by the network side according to the measurement report of the neighboring cell; and a first configuration module (not shown in the figure), configured to configure the current cell to which the cluster UE belongs as the neighboring cell according to channel resource information in the handover instruction.

Preferably, when the cluster UE is the listening user, the measurement module 60 includes: a first obtaining module (not shown in the figure), configured to obtain the neighboring cell information from scheduling information of a system information block; and a measurement sub-module (not shown in the figure), configured to measure the signal quality of the current cell and the signal quality of the neighboring cell according to the neighboring cell information and the current cell information.

Preferably, the handover module 64 includes: a second obtaining module (not shown in the figure), configured to obtain the neighboring cell resource information received from a specific forward access channel (FACH) of the cluster from a local storage module; and a second configuration module (not shown in the figure), configured to configure the current cell as the neighboring cell according to the neighboring cell resource information.

The cluster UE includes the above-mentioned apparatus for handing over a cluster UE.

Figure 7:
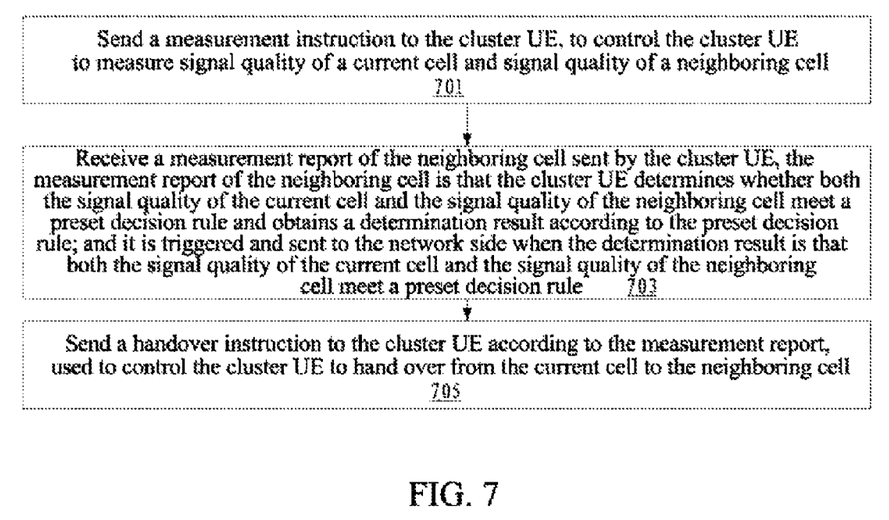
FIG. 7 is a flow chart of a method for handing over a cluster UE described in another embodiment of the present invention.

FIG. 7 is a flow chart of a method for handing over a cluster UE described in another embodiment of the present invention.

The method for handing over a cluster UE includes the following steps:

in step 701, sending a measurement instruction to the cluster UE, to control the cluster UE to measure signal quality of a current cell and signal quality of a neighboring cell;

in step 703, receiving a measurement report of the neighboring cell sent by the cluster UE, wherein, the measurement report of the neighboring cell is triggered and sent to the network side by the cluster UE according to the preset decision rule when determining that both the signal quality of the current cell and the signal quality of the neighboring cell meet the preset decision rule; and in step 705, sending a handover instruction to the cluster UE according to the measurement report, to control the cluster UE to hand over from the current cell to the neighboring cell.

Figure 8:
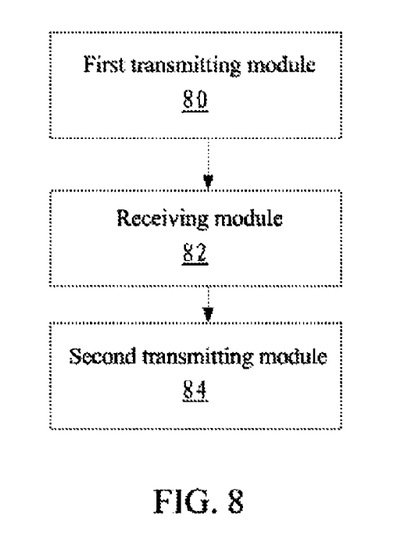
FIG. 8 is a structure diagram of an apparatus for handing over a cluster UE described in another embodiment of the present invention.

FIG. 8 is a structure diagram of an apparatus for handing over a cluster UE described in another embodiment of the present invention.

As shown in FIG. 8, the apparatus for handing over a cluster UE includes: a first transmitting module 80, configured to send a measurement instruction to the cluster UE, to control the cluster UE to measure signal quality of a current cell and signal quality of a neighboring cell; a receiving module 82, configured to receive a measurement report of the neighboring cell sent by the cluster UE, wherein, the measurement report of the neighboring cell is triggered and sent to the network side by the cluster UE according to the preset decision rule when determining that both the signal quality of the current cell and the signal quality of the neighboring cell meet the preset decision rule; and a second transmitting module 84, configured to send a handover instruction to the cluster UE according to the measurement report, to control the cluster UE to hand over from the current cell to the neighboring cell.

The network side device includes the above-mentioned apparatus for handing over a cluster UE.

In sum, as to the cluster UE in the speaking state, since the uplink channel resources are shared by the speaking user, the cluster UE in the speaking state can report the measurement report of the neighboring cell, and the network can determine to configure the UE to the target cell according to the measurement report reported by the cluster UE in the speaking state and the current state of the network, to successfully realize the handover process of the UE in the speaking state. As to the listening user: 1, the UE entering into the speaking state from the idle state reads the physical channel resource information of the neighboring cell, and then stores it, and the following handover can be handed over to the target cell according to the stored physical channel resource information of the neighboring cell. 2, as to the cluster UE in the listening state handed over to the listening state from the speaking state, it reads and stores the resource information of the neighboring cell as well when the state changes, and the following handover can be handed over to the target cell successfully according to the stored resource information of the neighboring cell. 3, as to the user who was the listening user before, the UE also reads the physical channel resource of the neighboring cell of the new cell after the handover; if the following handover occurs, it can be handed over to the target cell successfully according to the stored resource information.

The above description is the preferable embodiments of the present invention. It should be pointed out, for those skilled in the art, a plurality of modifications and improvements also can be made without departing from the described principles of the present invention, and all the modifications and improvements should be considered in the protection scope of the present invention.

INDUSTRIAL APPLICABILITY

Compared with the related art, in the embodiment of the present invention, the cluster UE in the speaking state can report the measurement report of the neighboring cell, and the network can determine to configure the UE to the target cell according to the measurement report reported by the cluster UE in the speaking state and the current state of the network, to successfully realize the handover process of the UE in the speaking state. As to the listening user, it can obtain the resource information of the neighboring cell from the local storage module, and the following handover can be handed over to the target cell successfully according to the stored resource information of the neighboring cell.

What is claimed is:

1. A method for handing over a cluster user equipment (UE), comprising:

measuring signal quality of a current cell and signal quality of a neighboring cell;

determining whether both the signal quality of the current cell and the signal quality of the neighboring cell meet a preset decision rule, and obtaining a determination result; and when the determination result is that both the signal quality of the current cell and the signal quality of the neighboring cell meet the preset decision rule, controlling the current cell to hand over to the neighboring cell, to make a cluster UE continue, in the neighboring cell, a service performed in the current cell;

wherein, when the cluster UE is a listening user in a group call, the method further comprises: before the handover, the UE reading a system information block (SIB) and configuring a specific forward access channel (FACH) of cluster according to the configuration resources of the specific FACH of cluster in the SIB; a network side sending on the specific FACH of cluster resource information of the current cell for configuring the UE to a listening state for listening to the group call and physical channel resource information of the neighboring cell for resource configuration in subsequent handover to the neighboring cell; the UE configuring the UE to the listening state for listening to the group call according to the resource information of the current cell and the UE storing the physical channel resource information of the neighboring cell in a local storage module; and the step of controlling the current cell to hand over to the neighboring cell comprises: the UE obtaining the physical channel resource information of the neighboring cell received from the specific FACH of cluster from the local storage module, and the UE in the listening state for listening to the group call directly configuring the current cell to be the neighboring cell according to the physical channel resource information of the neighboring cell.

2. The method according to claim 1, wherein, when the cluster UE is a speaking user, the step of measuring signal quality of a current cell and signal quality of a neighboring cell comprises:
receiving a measurement instruction of a network side, measuring the signal quality of the neighboring cell and the signal quality of the current cell according to neighboring cell information and current cell information in the measurement instruction.

3. The method according to claim 2, wherein, when the cluster UE is the speaking user, the step of controlling the current cell to hand over to the neighboring cell comprises:
triggering and sending a measurement report of the neighboring cell to the network side;
receiving a handover instruction sent by the network side according to the measurement report of the neighboring cell; and
configuring the current cell as the neighboring cell according to neighboring cell resource information in the handover instruction.

4. An apparatus for handing over a cluster user equipment (UE), comprising:
a measurement module, configured to measure signal quality of a current cell and signal quality of a neighboring cell;
a determination module, configured to determine whether both the signal quality of the current cell and the signal quality of the neighboring cell meet a preset decision rule, and obtain a determination result; and
a handover module, configured to: when the determination result is that both the signal quality of the current cell and the signal quality of the neighboring cell meet the preset decision rule, control the current cell to hand over to the neighboring cell, to make a cluster UE continue, in the neighboring cell, a service performed in the current cell;
wherein, when the cluster UE is a listening user in a group call, before the handover, the UE reads a system information block (SIB) and configures a specific forward access channel (FACH) of cluster according to the configuration resources of the specific FACH of cluster in the SIB; a network side sends on the specific FACH of cluster resource information of the current cell for configuring the UE to a listening state for listening to the group call and physical channel resource information of the neighboring cell for resource configuration in subsequent handover to the neighboring cell; the UE configures the UE to the listening state for listening to the group call according to the resource information of the current cell and the UE stores the physical channel resource information of the neighboring cell in a local storage module; and
the handover module comprises:
a second obtaining module, configured to obtain the physical channel resource information of the neighboring cell received from the specific FACH of cluster from the local storage module; and
a second configuration module, configured to, in the listening state for listening to the group call of the UE, directly configure the current cell to be the neighboring cell according to the physical channel resource information of the neighboring cell.

5. The apparatus according to claim 4, wherein, when the cluster UE is a speaking user, the measurement module comprises:
a first receiving module, configured to receive a measurement instruction of a network side, and measure the signal quality of the neighboring cell and the signal quality of the current cell according to neighboring cell information and current cell information in the measurement instruction.

6. The apparatus according to claim 5, when the cluster UE is the speaking user, the handover module comprises:
a triggering module, configured to trigger and send a measurement report of the neighboring cell to the network side;
a second receiving module, configured to receive a handover instruction sent by the network side according to the measurement report of the neighboring cell; and
a first configuration module, configured to configure the current cell as the neighboring cell according to neighboring cell resource information in the handover instruction.

7. A cluster user equipment (UE), comprising the apparatus for handing over a cluster UE according to claim 4.

8. An apparatus for handing over a cluster user equipment (UE), comprising:
a first transmitting module, configured to send a measurement instruction to the cluster UE, to control the cluster UE to measure signal quality of a current cell and signal quality of a neighboring cell;
a receiving module, configured to receive a measurement report of the neighboring cell sent by the cluster UE, wherein, the measurement report of the neighboring cell is triggered and sent to a network side by the cluster UE according to a preset decision rule when determining that both the signal quality of the current cell and the signal quality of the neighboring cell meet the preset decision rule; and
a second transmitting module, configured to send a handover instruction to the cluster UE according to the measurement report of the neighboring cell, to control the cluster UE to hand over from the current cell to the neighboring cell, to make the cluster UE continue, in the neighboring cell, a service performed in the current cell;
wherein, when the cluster UE is a listening user in a group call, before the handover, the UE reads a system information block (SIB) and configures a specific forward access channel (FACH) of cluster according to the configuration resources of the specific FACH of cluster in the SIB; a network side sends on the specific FACH of cluster resource information of the current cell for configuring the UE to a listening state for listening to the group call and physical channel resource information of the neighboring cell for resource configuration in subsequent handover to the neighboring cell; the UE configures the UE to the listening state for listening to the group call according to the resource information of the current cell and the UE stores the physical channel resource information of the neighboring cell in a local storage module; and
the cluster UE handing over from the current cell to the neighboring cell comprises: the UE obtaining the physical channel resource information of the neighboring cell received from the specific FACH of cluster from the local storage module, and the UE in the listening state for listening to the group call directly configuring the current cell to be the neighboring cell according to the physical channel resource information of the neighboring cell.

9. A network side device, comprising the apparatus for handing over a cluster user equipment (UE) according to claim 8.

10. A cluster user equipment (UE), comprising the apparatus for handing over a cluster UE according to claim 5.

11. A cluster user equipment (UE), comprising the apparatus for handing over a cluster UE according to claim 6.

* * * * *